United States Patent
Klein

(10) Patent No.: US 6,912,859 B2
(45) Date of Patent: Jul. 5, 2005

(54) METHOD AND APPARATUS FOR USING A MAIN AIR COMPRESSOR TO SUPPLEMENT A CHILL WATER SYSTEM

(75) Inventor: Eric Klein, Houston, TX (US)

(73) Assignee: Air Liquide Process and Construction, Inc., Houston, TX (US)

( * ) Notice: Subject to any disclaimer, the term of this patent is extended or adjusted under 35 U.S.C. 154(b) by 119 days.

(21) Appl. No.: 10/358,672

(22) Filed: Feb. 5, 2003

(65) Prior Publication Data

US 2003/0209020 A1 Nov. 13, 2003

Related U.S. Application Data

(60) Provisional application No. 60/356,245, filed on Feb. 12, 2002.

(51) Int. Cl.[7] .............................................. F25D 17/06
(52) U.S. Cl. ............................. 62/93; 62/179; 62/291; 62/310
(58) Field of Search ........................... 62/93, 285, 288, 62/291, 177, 179, 310; 261/27, 36.1, DIG. 3, DIG. 43

(56) References Cited

U.S. PATENT DOCUMENTS

| | | | | |
|---|---|---|---|---|
| 3,788,340 A | * | 1/1974 | O'Leary et al. | 137/93 |
| 3,850,007 A | | 11/1974 | McFarlan | |
| 4,813,240 A | * | 3/1989 | Hon | 62/171 |
| 4,931,187 A | | 6/1990 | Derham et al. | |
| 5,306,331 A | * | 4/1994 | Auvil et al. | 95/42 |
| 5,390,505 A | | 2/1995 | Smith | |
| 5,481,880 A | | 1/1996 | Guillard et al. | |
| 5,694,480 A | * | 12/1997 | Itakura | 382/141 |
| 5,851,441 A | * | 12/1998 | Kato et al. | 261/26 |
| 6,153,110 A | * | 11/2000 | Richardson et al. | 210/739 |
| 6,579,508 B2 | * | 6/2003 | Ishida | 423/220 |

FOREIGN PATENT DOCUMENTS

| | | |
|---|---|---|
| EP | 0160119 A1 * | 11/1985 |
| EP | 0524435 A | 1/1993 |
| EP | 0654643 A | 5/1995 |
| EP | 1148296 A | 10/2001 |
| GB | 476015 A | 11/1937 |
| JP | 58085093 A | 5/1983 |
| JP | 59170699 A | 9/1984 |
| JP | 01107082 A | 4/1989 |
| JP | 08260909 A | 10/1996 |

* cited by examiner

Primary Examiner—William E. Tapolcai
Assistant Examiner—Mohammad M. Ali
(74) Attorney, Agent, or Firm—Linda K. Russell; Elwood Haynes

(57) ABSTRACT

A method and an apparatus for providing make-up water for a chilled water system. A first water tower for cooling water is provided. Condensate water from a condensate water source is extracted. Make-up water for the first water tower is provided using the condensate water. The apparatus comprises a first water tower for generating cooling water; an air compressor to produce compressed air; a condensate water source to extract condensate water from the compressed air; and a water flow control system for providing water from the condensate water source to the first water tower.

27 Claims, 7 Drawing Sheets

METHOD AND APPARATUS FOR USING A MAIN AIR COMPRESSOR TO SUPPLEMENT A CHILL WATER SYSTEM

This application claims benefit of provisional Application No. 60/356,245 filed Feb. 12, 2002.

BACKGROUND OF THE INVENTION

1. Field of the Invention

This invention relates generally to a chilled water system, and, more particularly, to a method and apparatus for extracting make-up water from a main air compressor.

2. Description of the Related Art

The technology explosion in the manufacturing industry has resulted in many new and innovative manufacturing processes. Today's manufacturing processes, particularly industrial-type manufacturing processes, call for a large number of important steps. These process steps include transporting material, such as water and gas, about various locations of the manufacturing arena.

Many industrial applications call for the use of a chilled water system for cooling various liquids and gases used in industry applications. Many times, water systems are designed such that the flow of water may be controlled to cool the water and/or air that is exposed to the flow of the water. Many plants use cooled water and/or cooled air for various industrial applications. Often, water towers and cooling towers are employed to create a flow of water to implement chilled water systems. These flows of chilled water require considerable energy and produce excess water and/or gas, e.g., water in a gaseous state. Many industrial applications today do not utilize all of the available byproducts available from traditional chilled water systems.

In general, state of the art chilled water systems in air separation plants call for circulating a stream of cooling water through a nitrogen chill tower and/or a refrigeration unit to chill the water (e.g., chill water down to about 50–55° F.). This chilled water is then used to cool the air (typically after the aftercooler) prior to entering molecular sieve beds. The chilled water may come in direct contact with the air through a direct contact aftercooler or simply cool the air through a standard shell and tube exchanger. Once the chilled water has cooled the air, it is returned back to a self-contained water tower.

When water is circulated over a nitrogen chill tower, some of the water is evaporated. Owing to the nature of the evaporative process, the evaporating water leaves behind any dissolved solids contained therein. Thus, the dissolved solid content of the remaining liquid has a greater concentration of dissolved solid content. Some chilled water systems use cooling water as a source of make-up water. However, the problem with this approach lies in the fact that the dissolved solid content in this water is generally near a tolerable level. Using the cooling water as the make-up source coupled with the additional evaporation/concentrating effect in the chilled water loop can result in high saturation of the dissolved solids and precipitation. This could result in the formation of scales in various components of the chilled water system. The scaling, which results from saturation of the dissolved solids, may accumulate on the interior of various vessels of the chilled water system. This accumulation may result in packing of the scales, which may cause an increase in the pressure differential across the vessel. The increased pressure differential in various vessels of the water system may result in inefficiencies in heat transfer. Excessive accumulation of scale in the various components of a chilled water system generally requires replacement of the packing material.

A number of approaches to prevent or reduce accumulation of scaling may be implemented. However, each of these potential solutions promotes other problems in the efficient operation of the system. Excessive blow-down processes may be performed to reduce the amount of contaminants in water, concentration of scaling in the chilled water system. However, this practice requires additional cooling water to be sent to the chilled water system to compensate for the excessive blow-down. Often, this excessive blow-down results in the cooling tower operating with less than desirable concentration levels of dissolved solids. This approach may also result in an increase in water and chemical consumption for the cooling tower system, thereby reducing the operating efficiency of the chilled water system.

Acid feed implementations may be performed to counteract and increase alkalinity (pH) in the chilled water system, thereby reducing the potential for scaling formation. However, this approach presents problems, such as safety concerns and environmental issues. In addition, some dissolved solids, such as silica, may still precipitate even at the lower operating pH.

Another attempt to reduce scaling problems involves using the same make-up water source for the chilled water loop that is used to supply the cooling tower. However, this approach also presents problems. Due to contaminants in the make-up water, implementing a complete chemical feed system for pH control (acid) and inhibitor(s) may be necessary. This approach results in having to manage two cooling water systems that will require the same chemical treatment schemes. This may result in increased chemical costs and other equipment costs to perform the chemical treatment processes. Additionally, detrimental safety and environmental issues may exist in employing the current chemical systems used to reduce scaling and other problems in the current chilled water systems.

The present invention is directed to overcoming, or at least reducing, the effects of one or more of the problems set forth above.

SUMMARY OF THE INVENTION

In one aspect of the present invention, a system is provided for providing make-up water for a chilled water system. The system comprises a first water tower for generating cooling water; an air compressor to produce compressed air; a condensate water source to extract condensate water from the compressed air; and a water flow control system for providing water from the condensate water source to the first water tower.

In another aspect of the present invention, a method is provided for providing make-up water for a chilled water system. A first water tower for cooling water is provided. Condensate water from a condensate water source is extracted. Make-up water for the first water tower is provided using the condensate water.

In another aspect of the present invention, an apparatus is provided for providing make-up water for a chilled water system. The apparatus includes: a first water tower for generating cooling water; an air compressor to produce compressed air; a condensate water source to extract condensate water from the compressed air; and a controller for controlling at least one pump to provide water from the condensate water source to the first water tower.

In yet another aspect of the present invention, a computer readable program storage device encoded with instructions is provided for controlling a water flow system to provide make-up water for a chilled water system. The computer readable program storage device encoded with instructions that, when executed by a computer, performs a method, which comprises: providing a first water tower for cooling water; extracting condensate water from a condensate water source; and providing make-up water for the first water tower using the condensate water.

BRIEF DESCRIPTION OF THE DRAWINGS

The invention may be understood by reference to the following description taken in conjunction with the accompanying drawings, in which like reference numerals identify like elements, and in which.

Figure 1:
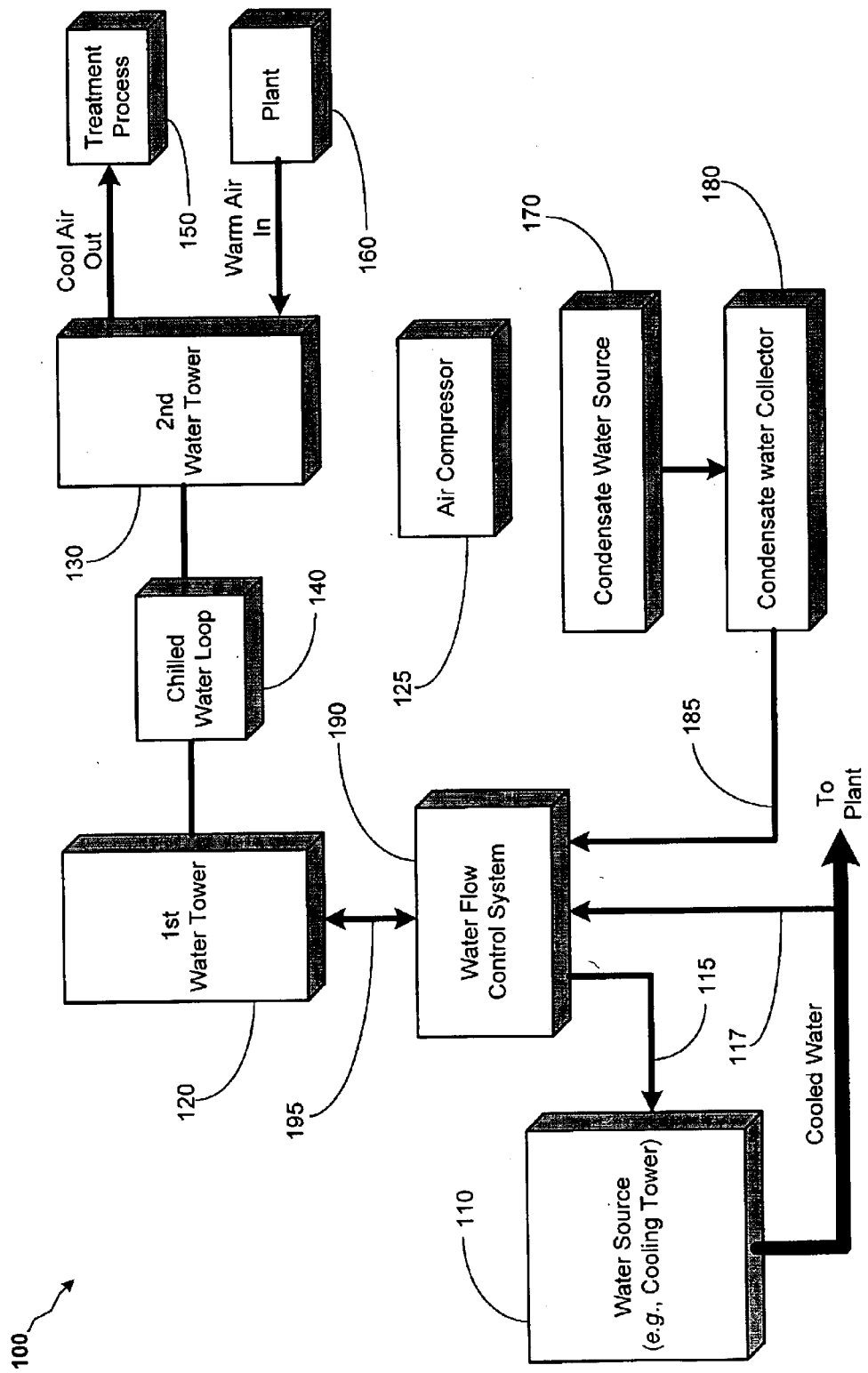
FIG. 1 is a block diagram of a chilled water system in accordance with one embodiment of the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Embodiments of the present invention provide for recapturing or utilizing excess byproducts in the form of condensate water to improve the efficiency and operation of a cooling system, such as a chilled water system. The present invention provides for utilizing a compressor, such as a main air compressor in a chilled water system, to capture condensate water provided by the main air compressor and utilizing the water provided by such source as a primary make-up water source to the chilled water system. Embodiments of the present invention provide for reducing the reliance of water from a cooling tower or other make-up water sources. Therefore, a greater level of pure water is provided to components of a chilled water system, such as the water towers. The greater the level of pure water, the less the need for blow-down processes, which may reduce scaling.

The main air compressor provides substantially pure water, therefore, when this water is used as a make-up water source, concentration of dissolved solids, and resulting scaling problems may be reduced. Additionally, a corrosion inhibitor may be utilized to provide additional cleansing of components of a chilled water system. Utilizing the substantially pure water reduces the need for chemical additives to produce acceptable low levels of contamination and accumulated concentration of dissolved solids. The make-up water source provided by embodiments of the present invention may be used as a supplemental make-up water source, a primary make-up water source, and/or a sole make-up water source.

A chilled water system is generally used to cool air received from a plant using air compression and a chilled water loop system. The cool air is sent to molsives for removal of water and other contaminates and eventually into a treatment process. Water that is used to cool the air may be chilled by utilizing cold waste nitrogen ($N_2$) that is placed into a column where the water is sprayed for cooling. During this process, evaporation may take place. The water flow may be routed through a refrigeration system before being sent to a direct contact cooling stage where the water is sprayed on incoming air, thereby cooling the air. The cooled air is then recycled back to a treatment process. In one embodiment, the chilled water system may implement an added loop in addition to a one-pass loop for cooling water from a nitrogen-chilled water tower.

When water is evaporated, whether it is in a cooling tower or in a chilled water tower, a certain amount of concentration of dissolved solids may accumulate, since solids generally do not evaporate. Generally, water from a water source 110, which may be a cooling tower, is used to make up water in a water tower, which exacerbates the problem of collection of solids even further. This is true, since water from the cooling tower may already contain a substantial amount of contaminants. Certain blow-down processes may be used to blow-down solids from the water towers; however, scaling still occurs in the water towers. Additionally, acid and/or other chemicals may be utilized to treat the water and lower the pH level in the water inside the cooling towers to reduce scaling. However, this method may cause additional inefficiencies of operation of a chilled water system. The condensate water provided by an air compressor may be used to supplement, or primarily provide, make-up water to the cooling towers, in which an appreciable amount of solid accumulation is reduced.

Turning now to FIG. 1, a block diagram depicting a system for providing a chilled liquid system (e.g., a chilled water system) in accordance with an embodiment of the present invention is provided. The system 100, which may be a chilled water system, comprises a water source 110 that is capable of providing water to a plant 160. The water source 110, in one embodiment, may be a cooling tower, which receives water and cools the water, which may be sent to a plant 160 associated with the system 100. Additionally, water from the water source 110 may be sent to a first water tower 120. The first water tower 120 may receive make-up water from the water source 110 via a water flow control system 190. The water flow control system 190 may receive water from the water source 110 on a water line 115. The water lines described in the present invention may comprise pipes, pumps, valves and other devices to control and facilitate the flow of water. The water flow control system 190 then diverts the water flow to the first water tower 120 via a water line 195.

The first water tower 120 may be coupled to a second water tower 130 via a chilled water loop 140. A more detailed description of the chilled water loop 140 is provided below in conjunction with FIG. 3. Continuing referring to FIG. 1, the second water tower 130 may provide cool air to a treatment process 150. The cool air provided to the treatment process 150 is based upon cooling warm air received from the plant 160. The system 100 also comprises a condensate water source 170, which is operatively coupled to a condensate water collector 180. The condensate water source 170 is capable of capturing condensate, such as condensate water. The condensate water source 170 may comprise an air compressor, which may provide a byproduct of condensate, such as condensate water. The condensate water collector 180 collects the condensate (e.g., condensate water) provided by the condensate water source 170 and delivers the condensate water to the water flow control system 190 via a water line 185. The system 100 described in FIG. 1 is capable of providing a secondary loop in addition to an initial water loop and uses the condensate water source 170 as a source of cleaner make-up water to be delivered to the first water tower 120 via the water flow control system 190. By utilizing the system 100 as shown in FIG. 1, the need for blow-down and/or chemical treatments may be reduced, thereby increasing the efficiency of the operation of a chilled water system.

Figure 2:
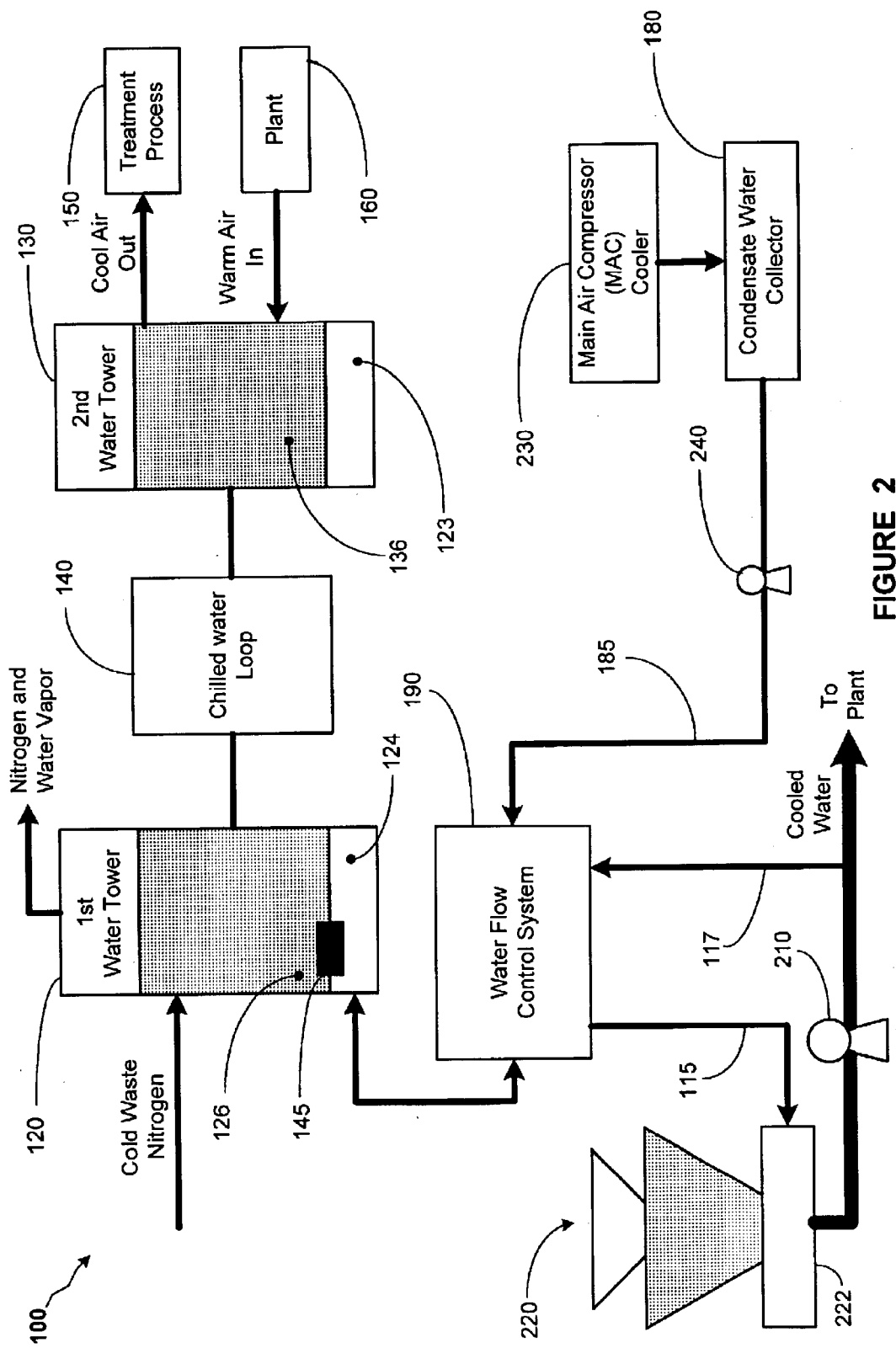
FIG. 2 illustrates a more detailed illustration of first and second water towers associated with the chilled water system of FIG. 1, in accordance with one embodiment of the present invention.

Turning now to FIG. 2, a more detailed illustration of various components of the chilled water system 100 shown in FIG. 1 is illustrated. The water source 110, in one embodiment, may be a cooling tower 220. Water from the cooling tower 220 is sent to the plant 160. A pump 210 controls the flow of cooled water from the cooling tower 220. A portion of the cooled water from the cooling tower 220 may be diverted to the water flow control system 190 via the line 117. The water flow control system 190 may receive a stream of water from the condensate water collector 180 via a pump 240. In one embodiment, the condensate water source 170 may be a main air compressor (MAC) cooler 230. The MAC cooler 230 may cause water to condense when air is compressed and then cooled.

When air is compressed and cooled, a condensing of natural humidity in the air occurs. This humidity may become concentrated in the MAC cooler 230 when the air is cooled. Generally, this condensed water is substantially pure. The water that evaporates off the first water tower 120 generally has no dissolved solids within, which leaves substantial amounts of contaminants in the first water tower 120. The condensate water collector 180 collects water from the main air compressor cooler 230 and provides the water to the water flow control system 190. The first water tower 120 and the second water tower 130 may accumulate a certain amount of dissolved solids that are not evaporated and become concentrated near the bottom, where a certain amount of water resides, as indicated by the water region 123 and 124. Accumulation of these solids can be detrimental to the proper operation of the chilled water system. The first water tower 120 may comprise a water level detector 145 that may indicate to the water flow control system 190 that additional make-up water is required as a result of evaporation and/or blow-down of the first water tower 120 or the second water tower 130.

The region in the first water tower 120, indicated by reference number 124 contains water and a region 126 contains cold waste nitrogen and water. Excess water accumulating in the first water tower 120 may be sent back to the cooling tower 220 via the water line 115, the flow of which may be controlled by the water flow control system 190. The water flow control system 190 may receive data from the water level detector 145 and control water flow in and/or out of the first water tower 120. Cold waste Nitrogen is pumped into the first water tower 120 to cool the water in the chilled water loop 140. Nitrogen and water vapor may be released from the first water tower 120, prompting the need for make-up water in the first water tower 120.

Chilled water provided by the chilled water loop 140 and the first water tower 120 is used by the second water tower 130 to cool air. In the second water tower 130, chilled water from the chilled water loop 140 is used to cool the warm air received from the plant 160. In a region 136 in the second water tower 130, the warm air received from the plant 160 is cooled and the resultant cool air is sent to the treatment process 150. More detailed descriptions of the chilled water loop 140 and the water flow control system 190 is provided in FIGS. 3 and 4 and accompanying descriptions provided below.

Figure 3:
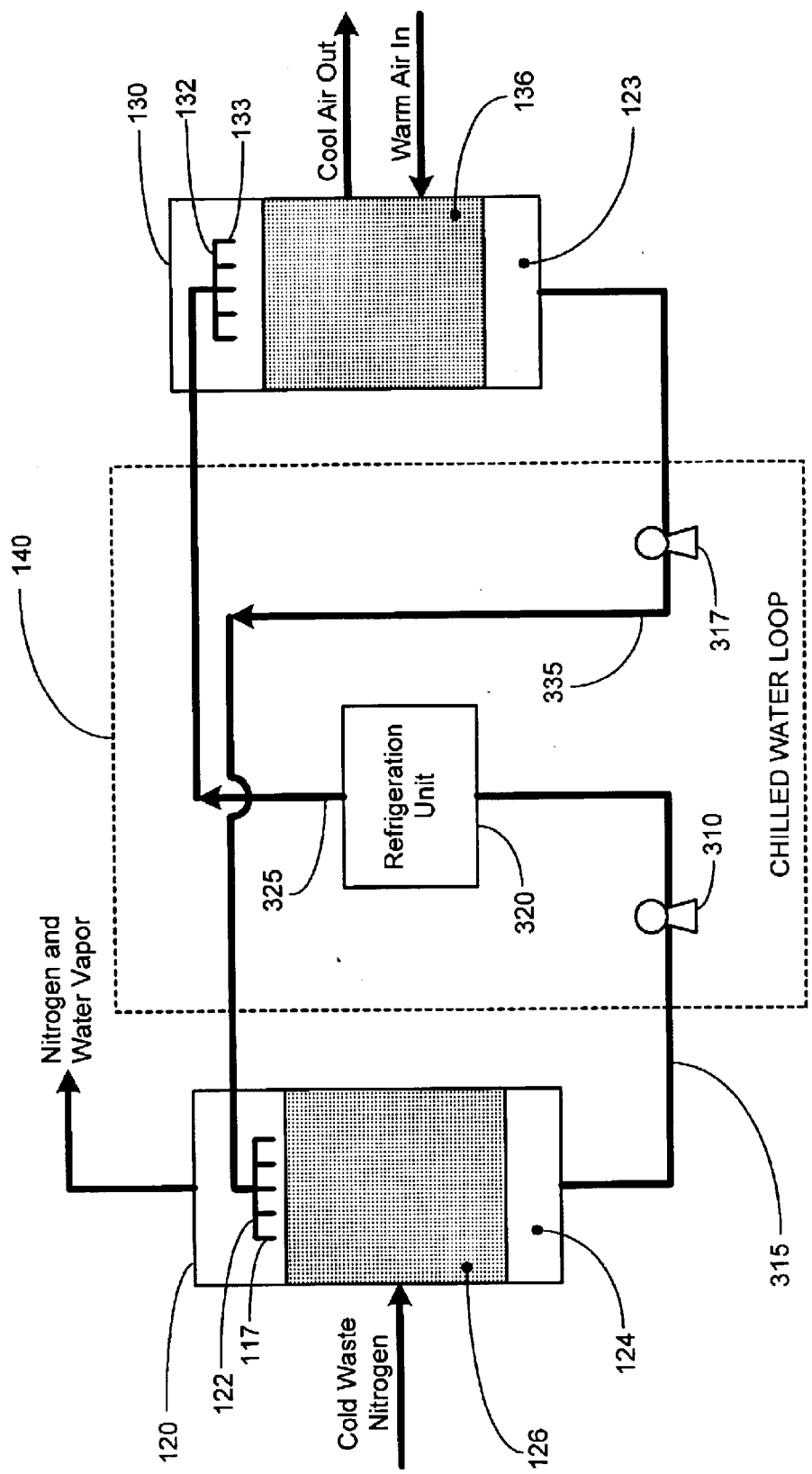
FIG. 3 illustrates a more detailed illustration of a chilled water loop associated with the chilled water system of FIG. 1, in accordance with one embodiment of the present invention.

Turning now to FIG. 3, a more detailed illustration of the chilled water loop 140 in relation to the first and second water towers 120, 130 is illustrated. The chilled water loop 140 provides a water flow from the first water tower 120 to the second water tower 130 and back, to chill the water. In one embodiment, the chilled water loop 140 is a closed loop system. A pump 310 pumps water from the first water tower 120 on a water line 315 through a refrigeration unit 320. The refrigeration unit 320 may utilize, for example, ammonia as a cooling agent for cooling the water in the chilled water loop 140. Those skilled in the art having benefit of the present disclosure will appreciate that any of a variety of refrigeration techniques may be used to cool the water in the chilled water loop 140 without departing from the spirit and scope of the instant invention.

The chilled water loop 140 continues directing water from the refrigeration unit 320 on a water line 325 into the second water tower 130. The water line 325 may terminate into a water spray unit 132, which may spray water over the air area indicated by the reference number 136. The water spray unit 132 may comprise one or more spray nozzles 133 to spray water into the region 136 in the second water tower 130. The sprayed water then cools the air in the region 136. The water settles near the bottom of the second water tower 130 in the area 123. The chilled water loop 140 also comprises another water line 335, which is looped into the first water tower 120.

The water line 335 may terminate into a water spray unit 122, which sprays water over the cold waste nitrogen section 126, from which the water settles into the section 124 of the first water tower 120. In the second water tower 130, the heat exchange between the sprayed water and the air in the region 136 may cause the water that settles in the region 123 to become warmer. The water is then recycled back into the chilled water loop 140 by a pump 317, or by air resistance from the second water tower 130, onto the water line 335, which directs the water into the first water tower 120. In the first water tower 120, the water spray unit 122, which comprises one or more spray nozzles 117, sprays water into the region 126, which may contain cold waste Nitrogen. The cold waste Nitrogen in the region 126 cools the sprayed water, which settles into the region 124. The water from the region 124 in the first water tower 120 is directed back into the chilled water loop 140 by the pump 310 and the processes is repeated, thereby providing a closed loop chilled water loop 140. Therefore, water is cooled in the first water tower 120 and in the refrigeration unit 320, and the heat transfer in the second water tower 130 causes the water to become warmer. The warmer water from the second water tower 130 is again re-cycled to the first water tower 120 and into the remaining components of the chilled water loop 140 and is cooled again; the process is then repeated. Part of the heat dissipation from this process is due to evaporation of water (water vapor) from the first water tower 120. This evaporation results in concentration of dissolved solids and the need for make-up water to the first water tower 120.

Figure 4:
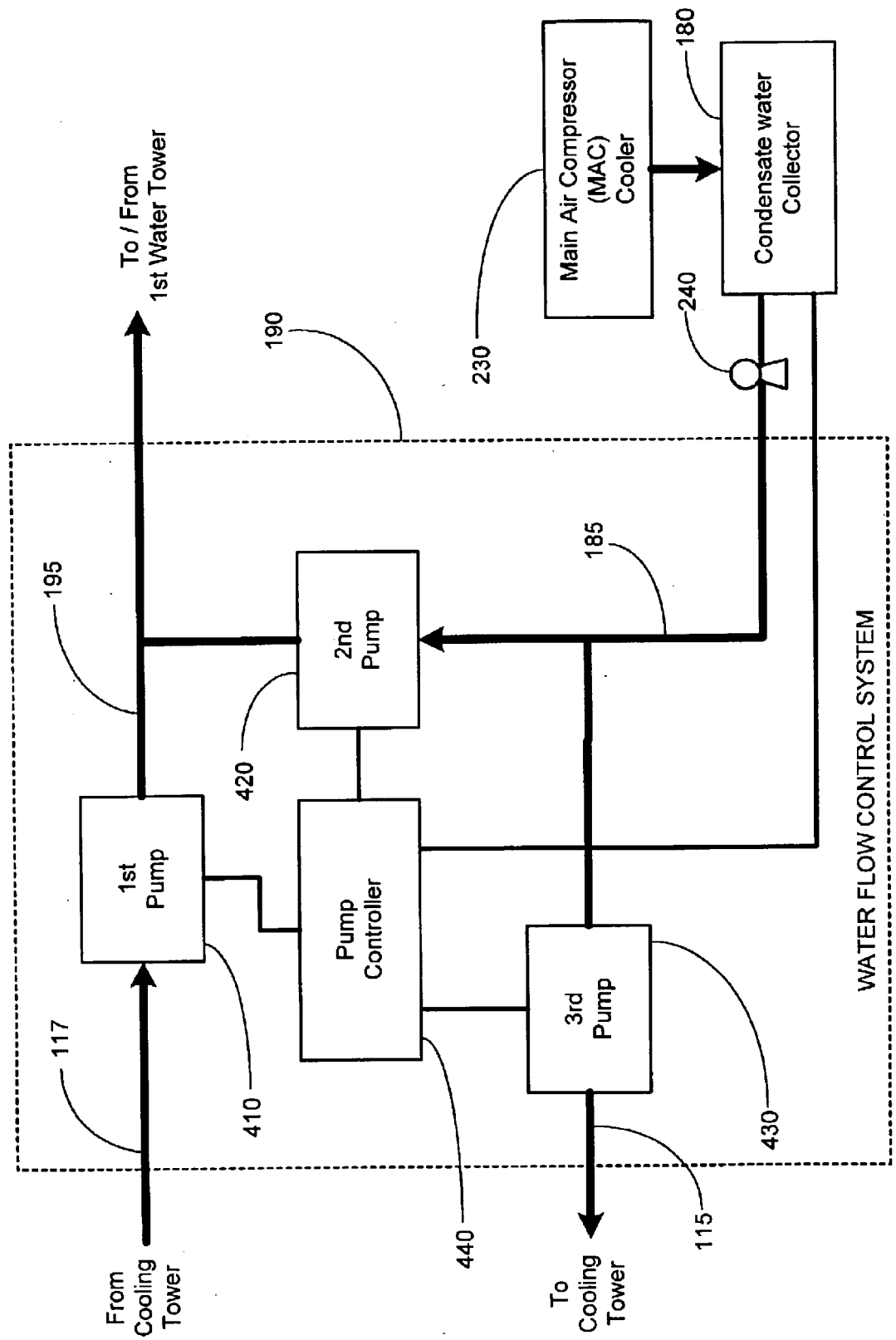
FIG. 4 illustrates a more detailed illustration of a water flow control system associated with the chilled water system of FIG. 1, in accordance with one embodiment of the present invention.

The flow of the water from the cooling tower 220 and/or the MAC cooler 230 into, and out of, the first water tower 120 is generally controlled by the water flow control system 190. FIG. 4 illustrates a more detailed block diagram depiction of the water flow control system 190 in accordance with embodiments of the present invention. The water flow control system 190 comprises at least a first pump 410, a second pump 420, a third pump 430, and a pump controller 440. Water from the cooling tower 220 is sent to the first pump 410 via the water line 117. The first pump 410 is capable of pumping water from the cooling tower 220 into the first water tower 120 via the water lines 117 and 195. Water from the condensate water collector 180, which collects condensate water from the MAC cooler 230, is pumped to the water flow control system 190 by the pump 240 via the water line 185.

The second pump 420 is capable of pumping water from the water line 185 into the first water tower 120. In one embodiment, the second pump 420 is utilized as the primary pump to provide make-up water to the first water tower 120, wherein the supplemental source of make-up water is the cooling tower 220. Alternatively, the second pump 420 may be a pump that is designated to provide supplemental make-up water to the first water tower 120, wherein the primary supply of make-up water is the cooling tower 220. The operations of the pumps 410, 420, 430 in the water flow control system 190 may be coordinated by a pump controller 440 to properly distribute water in the system 100.

The pump controller 440 may comprise a computer system. In an alternative embodiment, the pump controller 440 may comprise a controller that comprises software, hardware, and/or firmware to perform one or more control operations based upon inputs received by various components of the system 100 and/or from a computer system. For example, the pump controller 440 may receive data from numerous components in the system 100 including the water level detector 145, the condensate water collector 180, and/or other components of the system 100.

A third pump 430 in the water flow control system 190 is capable of pumping water from the first water tower 120 to the cooling tower 220. Upon a determination that excess water is present in the region 124, the second and third pumps 420, 430 may pump excess water from the first water tower 120, to a reservoir 222 (see FIG. 2) associated with the cooling tower 220. Therefore, the pump controller 440 detects the water level of the region 124 in the first water tower 120 and operates the first, second, and/or the third pump 410, 420, 430 to facilitate a water flow that provides a desired level of water in the first water tower 120. If excess condensate is not needed in the first water tower 120, the water flow control system may direct the excess to the cooling tower 220. A similar water flow control system 190 may be employed to control the water flow in and out of the second water tower 130. Generally, make-up water from the MAC cooler 230 and the condensate water collector 180 is pumped into the first water tower 120 via the second pump 420, which provides substantially pure make-up water into the first water tower 120, thereby reducing particles and other contaminants in the first water tower 120. The water flow control system 190 may comprise additional pumps, valves, and the like, to control the water flow in the system 100.

Figure 5:
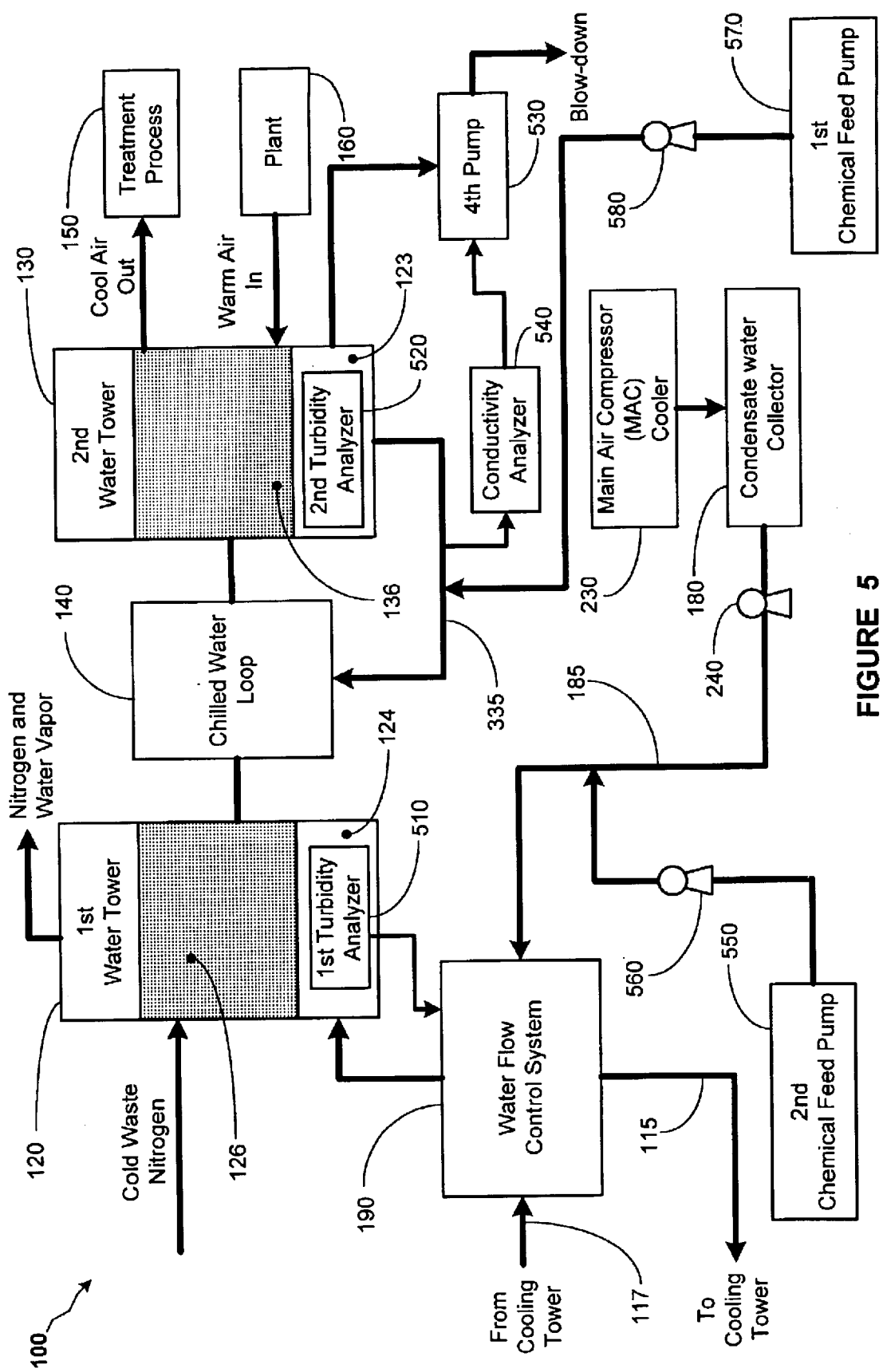
FIG. 5 illustrates a more detailed illustration of the chilled water system of FIG. 1, in accordance with one embodiment of the present invention.

Turning now to FIG. 5, a more detailed block diagram depiction of an embodiment of the system 100 is illustrated. Due to the fact that the chilled water system 100 is scrubbing the air (i.e., inserting warm air from the plant 160 into the second water tower 130, cooling the air, and pumping it out to a treatment process 150), contamination, and particulate matter, periodically enter the chilled water system 100. These particulates may produce an undesirable level of turbidity in the water that is circulated by the chilled water loop 140. Turbidity in the water may be accompanied by discoloration, and thus, may be detected and compared it to an acceptable margin of tolerance. Accordingly, embodiments of the present invention provide for a first turbidity analyzer 510 and a second turbidity analyzer 520 to be implemented into the first and second water towers 120, 130, respectively.

The turbidity analyzers 510, 520 are capable of measuring a certain amount of turbidity and generating a signal indicating that the turbidity has exceeded a predetermined threshold. Alternatively, the turbidity analyzers 510, 520 may simply provide a signal indicative of the turbidity in the water. The signal may then be interpreted by the water flow control system 190 or other components in the system 100 to determine whether the level of turbidity of the water is above a threshold. The first turbidity analyzer 510 may provide a signal to the water flow control system 190 to indicate that excessive turbidity has been detected in the first water tower 120. A blow-down process may be implemented by the water flow control system 190 in response to a detection of excessive turbidity. Additionally, or alternatively, a second chemical feed pump 550 may provide chemicals, which may be pumped by the pump 560 into the water line 185 to condition the water in the first cooling tower 120. The chemicals may be used to perform conditioning of the water in the system 100. The water flow control system 190 may then pump water containing the chemicals from the second chemical feed pump 550 into the first water tower 120. Additionally, the water flow control system 190 may also contain a device that may detect the conductivity of the water in the first water tower 120 or in the various water lines in the system 100 and perform blow-down or other corrective processes in response. In one embodiment, the second chemical feed pump 550 is coupled to the water line 185 to be mixed with the water from the condensate water collector 180 (i.e., water from the MAC cooler 230). As a result, chemicals are added to substantially pure water such that the pH and/or the turbidity levels of the water in the system 100 may be more accurately controlled.

The second turbidity analyzer 520 detects turbidity of the water in the second water tower 130. Based upon data from the second turbidity analyzer 520, which may provide a signal indicating that a particular turbidity of the water in the second water tower 130 exceeds a predetermined threshold, a fourth pump 530 may perform a blow-down process to reduce the turbidity of the water in the second water tower 130. Additionally, a conductivity analyzer 540 may be coupled to the water line 335. The conductivity analyzer 540 detects the conductivity of the water from the second water tower 130. The conductivity analyzer 540 may provide data indicating the level of conductivity and/or an indication that the conductivity level may be above a predetermined threshold. In response, the fourth pump 530 may pump water out of the second water tower 130 to perform a blow-down process. Additionally or alternatively, a first chemical feed pump 570 may provide chemicals that may be pumped by the pump 580 into the water line 335 in response to particular turbidity level indications that are provided by the second turbidity analyzer 520, and/or the conductivity level indications that are provided by the conductivity analyzer 540.

Chemicals from the first chemical feed pump 570 may be used to control the turbidity levels, the conductivity levels, and/or other water characteristics. Therefore, utilizing the various detectors, chemical feed pumps, and/or the like, water flow with more stable characteristics may be circulated throughout the system 100. Furthermore, the significantly pure water provided by the MAC cooler 230 may become "aggressive" in the system 100. Therefore, inhibitors may be fed into the chilled water loop 140 and/or into the first and second water towers 120, 130 by the first and/or the second chemical feed pumps 550, 570. This may reduce excessive corrosion from developing in the system 100.

Figure 6:
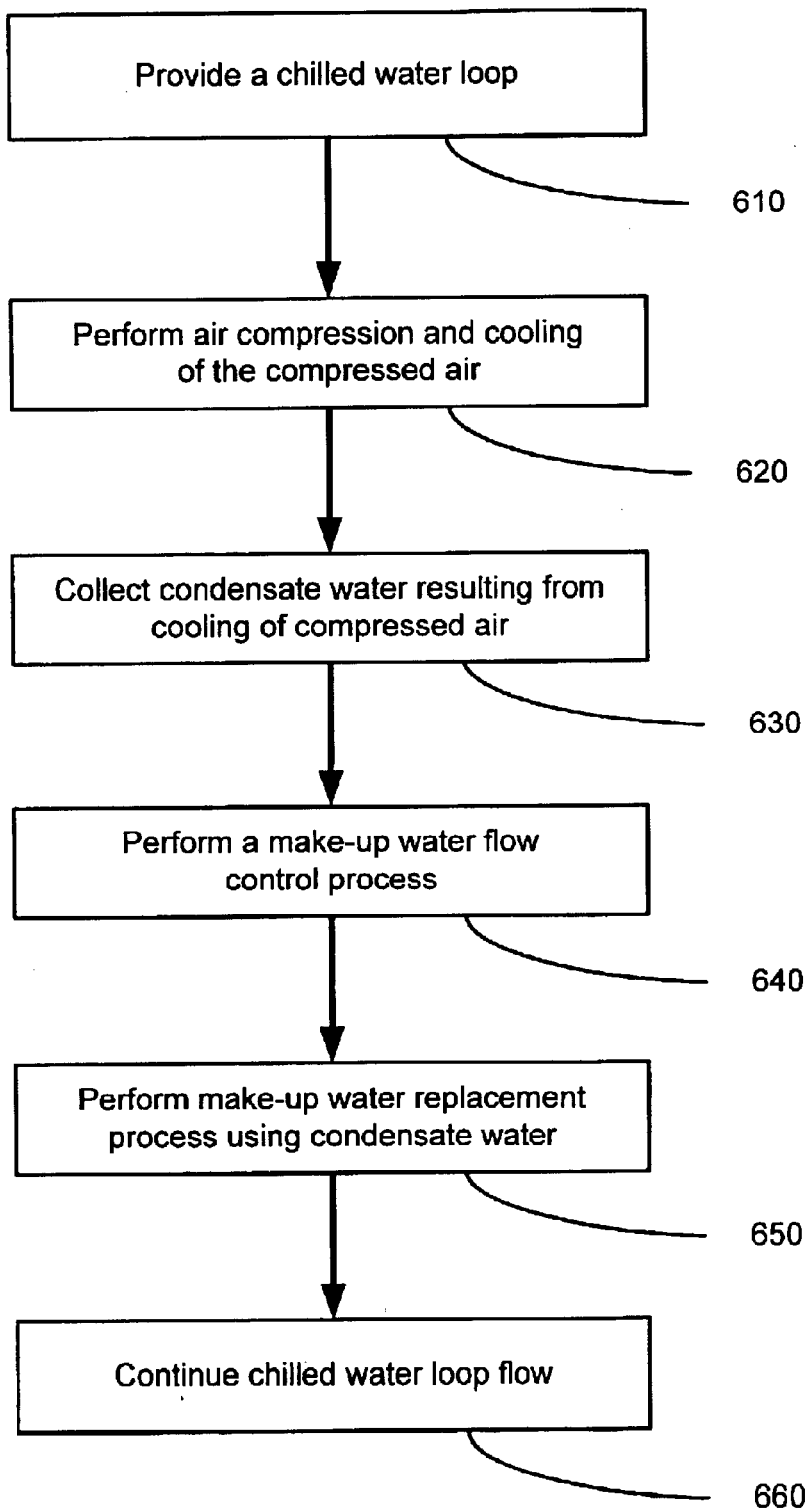
FIG. 6 illustrates a flowchart depiction of a method in accordance with one illustrative embodiment of the present invention.

Turning now to FIG. 6, a flow chart depiction of a method in accordance with an embodiment of the present invention is illustrated. A chilled water system 100 is set up to provide a chilled water loop, such as the chilled water loop 140 described above (block 610). The chilled water loop 140 and the system 100 in general, comprise an air compression unit, such as the main air compressor cooler 230. The system 100 performs air compression to facilitate the chilled water system and cools the compressed air (block 620). Generally, following the principle provided by Equation 1:

$$PV=nRT;\qquad\qquad\text{Equation 1}$$

which indicates that temperature (T) is proportional to a pressure (P), applying energy to the air (i.e., compressing the air, thereby increasing the pressure) causes a rise in the temperature of the air. As the air temperature rises, the more water vapor the air can hold. Upon cooling the compressed air, the energy is released in accordance with the cryogenic process of cooling the air, and the stored vapor held by the hot compressed air is released as moisture and condensate water.

Upon cooling the compressed air, condensate water is produced. The system 100 collects the condensate water (block 630). Generally, the condensate water is collected by the condensate water collector 180, which may comprise a water tank. The condensate water is substantially pure water, i.e., water that is substantially free of contaminants and particulate matter. The pump 240 may then pump the substantially pure water that is collected by the condensate water collector 180, into the water flow control system 190, which eventually provides make-up water into the first water tower 120. The system 100 performs a make-up water flow control process to provide condensed water that is substantially pure as make-up water into the system 100 (block 640). A more detailed illustration and description of the step of performing the make-up water flow control process as shown in block 640 is provided in FIG. 7 and accompanying description below.

Upon performing the make-up water flow control process, the system 100 performs a water make-up replacement process using the condensate water (block 650). In other words, the water flow control system 190 detects low water levels in the first water tower 120 and/or a response to having performed a blow-down process, and performs a make-up water process by pumping make-up water in the condensate water collector 180 to the first water tower 120. The system 100 then continues the chilled water loop flow using the chilled water loop 140 to cool the warm air from the plant 160 and provide cool air to the treatment process 150 (block 660).

Figure 7:
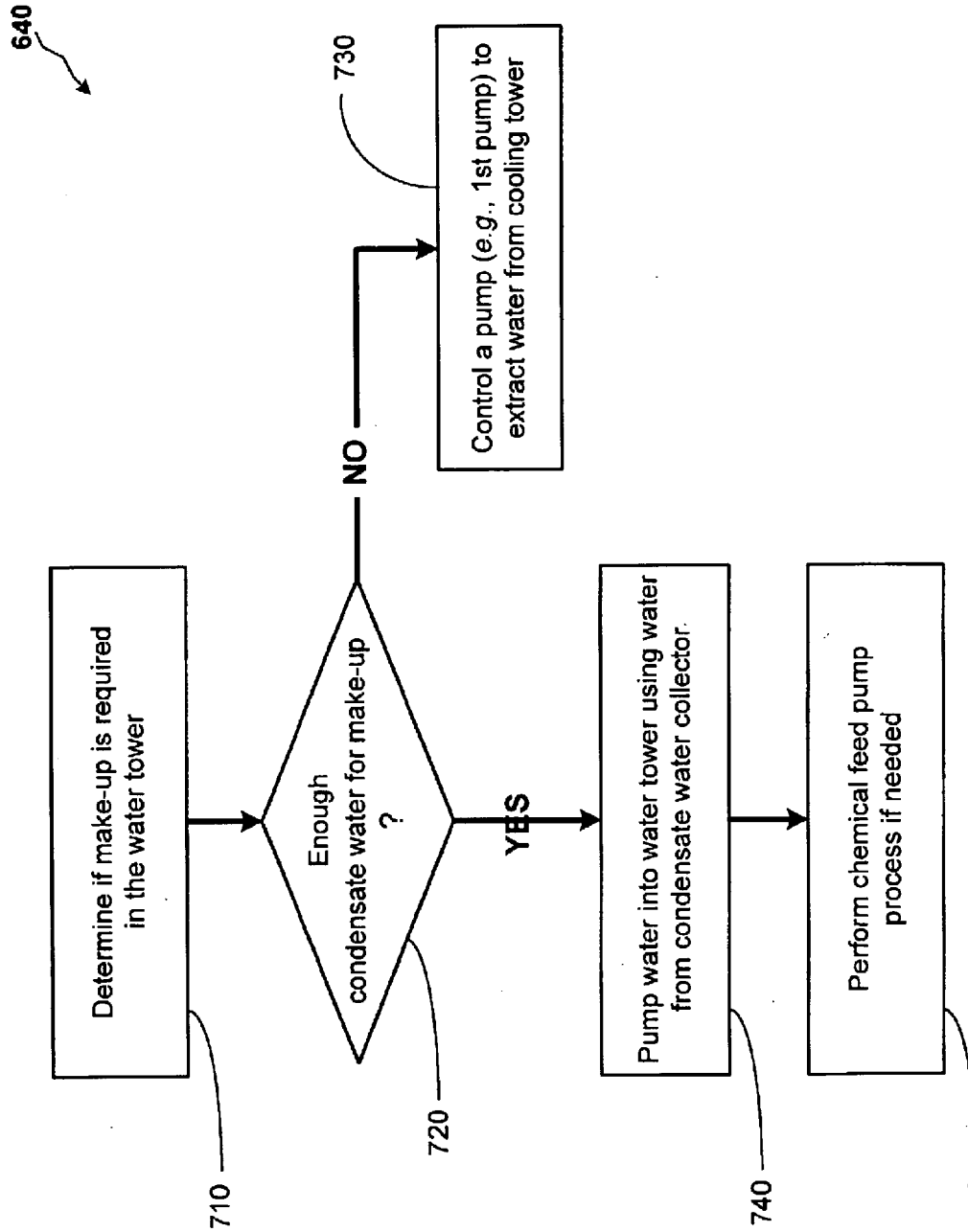
FIG. 7 illustrates a more detailed flowchart depiction of a method of performing a make-up water flow control process, as indicated in FIG. 6, in accordance with one illustrative embodiment of the present invention.

Turning now to FIG. 7, a flow chart depiction of a more detailed step of performing the make-up water flow control process indicated in block 640 of FIG. 6 is illustrated. The system 100 determines whether make-up water is required in the first water tower 120 (block 710). Several types of analyses, such as a water level check, turbidity analysis, conductivity analysis, and/or analysis of accumulation of particles or scaling, may be performed to determine if a blow-down or other corrective action should be performed. If such a corrective action is performed, the water level in the first water tower 120 may be altered and the system 100 will determine whether make-up water is required. Additionally, water vapor, along with Nitrogen, is generally released from the first water tower 120, thereby requiring adjustment to the water level in the first water tower 120.

The system 100 determines whether enough condensate water is available for performing a water make-up process (block 720). If the system 100 determines that there is not enough condensate water (i.e., condensate water available in the condensate water collector 180), the system 100 controls a pump (e.g., the first pump 410 shown in FIG. 4) to pump water from an alternative water source 110, such as a cooling tower 220, into the first water tower 120 (block 730).

However, when the system 100 determines that adequate condensate water for make-up is available from the condensate water collector 180, the condensate water is pumped into the first water tower 120 (block 740). Additionally, if needed, the chemical feed pumps 550, 570 may be implemented such that chemical are injected into the water lines, which eventually provide the water into the first and/or second water towers 120, 130 (block 750). Upon performing the steps described in FIG. 7, the make-up water flow control process is substantially complete.

Utilizing embodiments of the present invention to re-capture byproducts (e.g., condensate water provided by a MAC cooler 230), many problems associated with a chilled water system may be reduced. Scaling in various components of the chilled water system may be reduced by utilizing substantially pure water in the chilled water loop 140. Embodiments of the present invention provide for acquiring and using the substantially pure water.

Additionally, upon performing blow-down processes and/or other corrective measures to improve the water conditions, and/or to replace water, pressure differential across various components associated with the chilled water system 100 may exist, which may now be reduced using the make-up water source provided by the MAC cooler 230. Therefore, water costs in trying to replace water with an external water source may be reduced by implementing embodiments of the present invention. Furthermore, embodiments of the present invention provide for performing more efficient reductions in contaminants, improving turbidity levels, optimizing conductivity levels, and the like. This may lead to appreciable energy saving in the operation of the chilled water system. Additionally, implementing embodiments of the present invention, frequent need for chemical feed and other corrective actions may be reduced, thereby reducing chemical costs and reducing equipment costs associated with the corrective actions. Also, reducing various equipment and chemicals used in the system 100 provides for improved safety and a reduction in environmental problems associated with prior art techniques. The novel usage of feeding-back condensate water using an air compressor cooler provides for more efficient operation of a chilled water system.

The particular embodiments disclosed above are illustrative only, as the invention may be modified and practiced in different, but equivalent, manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A chilled water system, comprising:
    a first water tower for generating cooling water;
    an air compressor to produce compressed air;
    a condensate water source to extract condensate water from said compressed air;
    a water flow control system for providing water from said condensate water source to said first water tower,
    a second water tower, said second water tower to cool air using said cooling water, and
    a chilled water loop operatively coupled to said first and said second water towers, said chilled water loop comprising at least one water path forming a substantially closed loop path for transporting cooling water from the first water tower to said second water tower and transporting water from second water tower to said first water tower.

2. The chilled water system of claim 1, wherein said chilled water loop comprising:
    a refrigeration unit coupled in a portion of said water path for transporting cooling water from the first water tower to said second water tower, said refrigeration unit being adapted to cool said water;
    a first pump for delivering cooling water from said first water tower through said refrigeration unit and into said second water tower; and
    a second pump for pumping water from said second water tower to said first water tower.

3. The chilled water system of claim 1, wherein said second water tower comprising:
    a first region for receiving cooling water from said chilled water loop;
    a second region for cooling air using said cooling water; and
    a third region for collecting water.

4. The chilled water system of claim 3, wherein said third region comprising at least one of a turbidity analyzer and a conductivity analyzer.

5. The chilled water system of claim 1, wherein said first water tower comprising
    a first region for receiving water from said chilled water loop;
    a second region for cooling said water using said cooling substance; and
    a third region for collecting water.

6. The chilled water system of claim 5, wherein said third region comprising at least one of a water level indicator, a level turbidity analyzer, and a conductivity analyzer.

7. The chilled water system of claim 5, wherein said cooling substance comprises cold waste Nitrogen.

8. The chilled water system of claim 5, further comprising a cooling tower to provide a supplemental source of water for said first water tower.

9. The chilled water system of claim 8, wherein said condensate water source is an air compressor cooler that is capable of generating condensate water.

10. The chilled water system of claim 8, wherein said water flow control system for providing water from said condensate water source to said first water tower further comprises a water flow control system for directing water from said condensate water source to said first water tower, said water flow control system comprising;
    a first pump for pumping water from said cooling tower to said first water tower;
    a second pump for pumping water from said condensate water source to said first water tower;
    a third pump for pumping excessive water from said first water tower to said cooling tower; and
    a controller for controlling an operation of at least one of said first pump, second pump and said third pump.

11. The chilled water system of claim 1, further comprising at least one of a first chemical feed pump to provide a chemical into said first water tower; and a second chemical feed pump to provide a chemical into said second water tower.

12. An apparatus, comprising:
    a first water tower for generating cooling water;
    an air compressor to produce compressed air;
    a condensate water source to extract condensate water from said compressed air; and
    a controller for controlling at least one pump to provide water from said condensate water source to said first water tower.

13. The apparatus of claim 12, further comprising a second water tower, said second water tower to cool air using said cooling water.

14. The apparatus of claim 13, further comprising a chilled water loop operatively coupled to said first and said second water towers, said chilled water loop comprising a plurality of water paths forming a substantially closed loop multiple path for transporting cooling water from the first water tower to said second water tower and transporting water from second water tower to said first water tower.

15. The apparatus of claim 12, further comprises means said for providing water from said condensate water source to said first water tower, said means being controlled by said controller.

16. A method, comprising:
    providing a first water tower for cooling water, wherein providing make-up water for said first water tower comprises:
        determining whether a make-up water process is required for said first water tower;
        determine whether enough condensate water is available for performing said make-up water process in response to a determination that said make-up water process is required;

pumping condensate water from a condensate water source to said first water tower;

extracting condensate water from a condensate water source; and providing make-up water for said first water tower using said condensate water.

17. The method of claim 16, wherein extracting condensate water from a condensate water source further comprises compressing air to produce compressed air and cooling said compressed air.

18. The method of claim 16, further comprising providing a chilled water loop to provide chilled water into a second water tower for cooling air.

19. The method of claim 18, further comprising performing at least one of a turbidity analysis and a conductivity analysis of water in said first water tower.

20. The method of claim 19, further comprising performing a chemical feed pump process for injecting a chemical into said first water tower.

21. The method of claim 19, further comprising performing a blow-down process upon said first water tower in response to at least one of said turbidity analysis and said conductivity analysis.

22. An apparatus, comprising:

a first water tower for cooling water;

means for extracting condensate water from a condensate water source; and means for providing make-up water for said first water tower using said condensate water, wherein providing make-up water for said first water tower comprises:

determining whether a make-up water process is required for said first water tower;

determine whether enough condensate water is available for performing said make-up water process in response to a determination that said make-up water process is required;

pumping condensate water from a condensate water source to said first water tower.

23. The computer readable program storage device encoded with instructions that, when executed by a computer, performs the method of claim 22, wherein extracting condensate water from a condensate water source further comprises compressing air to produce compressed air and cooling said compressed air.

24. The computer readable program storage device encoded with instructions that, when executed by a computer, performs the method of claim 22, further comprising providing a chilled water loop to provide chilled water into a second water tower for cooling air.

25. The computer readable program storage device encoded with instructions when executed by a computer, performs the method of claim 22, further comprising performing at least one of a turbidity analysis and a conductivity analysis of water in said first water tower.

26. The computer readable program storage device encoded with instructions that, when executed by a computer, performs the method of claim 24, further comprising performing a chemical feed pump process for injecting a chemical into said first water tower.

27. The computer readable program storage device encoded with instructions that, when executed by a computer, performs the method of claim 22, further comprising performing a blow-down process upon said first water tower in response to at least one of said turbidity analysis and said conductivity analysis.

* * * * *

UNITED STATES PATENT AND TRADEMARK OFFICE
CERTIFICATE OF CORRECTION

PATENT NO.    : 6,912,859 B2
DATED         : July 5, 2005
INVENTOR(S)   : Eric Klein It is certified that error appears in the above-identified patent and that said Letters Patent is hereby corrected as shown below:

Column 12,
Line 9, replace the words "claim 5" with the words -- claim 1 --.
Line 29, insert the word -- said -- between "pump," and "second".
Line 43, after the word "tower", insert the words -- a second water tower, said second water tower to cool air using said cooling water, and a chilled water loop operatively coupled to said first and said second water towers, said chilled water loop comprising at least one water path forming a substantially closed loop path for transporting cooling water from the first water tower to said second water tower and transporting water from second water tower to said first water tower --.
Line 64, replace the word "determine" with the word -- determining --.

Column 13,
Line 6, after the word "water", insert the words -- a second water tower, said second water tower to cool air using said cooling water, and a chilled water loop operatively coupled to said first and said second water towers, said chilled water loop comprising at least one water path forming a substantially closed loop path for transporting cooling water from the first water tower to said second water tower and transporting water from second water tower to said first water tower --.
Line 34, replace the word "determine" with the word -- determining --.

UNITED STATES PATENT AND TRADEMARK OFFICE
CERTIFICATE OF CORRECTION

PATENT NO. : 6,912,859 B2
DATED : July 5, 2005
INVENTOR(S) : Eric Klein

It is certified that error appears in the above-identified patent and that said Letters Patent is hereby corrected as shown below:

Column 14,
Line 4, after the word "tower", insert the words -- a second water tower, said second water tower to cool air using said cooling water, and a chilled water loop operatively coupled to said first and said second water towers, said chilled water loop comprising at least one water path forming a substantially closed loop path for transporting cooling water from the first water tower to said second water tower and transporting water from second water tower to said first water tower --.
Lines 14, 19 and 30, replace the words "claim 22" with the words -- claim 16 --.

Signed and Sealed this

Thirtieth Day of August, 2005

JON W. DUDAS
*Director of the United States Patent and Trademark Office*